(12) United States Patent
Fehrenbach et al.

(10) Patent No.: US 7,075,480 B2
(45) Date of Patent: Jul. 11, 2006

(54) LEVEL MEASUREMENT DEVICE HAVING ELECTRONICS AND ANTENNA IN ONE HOUSING

(75) Inventors: Josef Fehrenbach, Haslach (DE); Juergen Motzer, Gengenbach (DE); Daniel Schultheiss, Hornberg (DE); Karl Griessbaum, Muehlenbach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 10/508,600

(22) PCT Filed: Apr. 9, 2003

(86) PCT No.: PCT/EP03/03695

§ 371 (c)(1), (2), (4) Date: Apr. 15, 2005

(87) PCT Pub. No.: WO03/085365

PCT Pub. Date: Oct. 16, 2003

(65) Prior Publication Data

US 2005/0225480 A1    Oct. 13, 2005

Related U.S. Application Data

(60) Provisional application No. 60/371,990, filed on Apr. 10, 2002.

(51) Int. Cl.
*G01F 23/284* (2006.01)
*G01S 13/08* (2006.01)

(52) U.S. Cl. .............. 342/124; 342/118; 73/290 R; 324/629; 324/637; 324/642; 324/644

(58) Field of Classification Search ............... 342/118, 342/124, 175, 190–197; 73/290 R, 304 R, 73/304 C, 290 B; 324/629, 637–646
See application file for complete search history.

(56) References Cited

U.S. PATENT DOCUMENTS

| | | | | |
|---|---|---|---|---|
| 4,205,315 A | * | 5/1980 | Fleenor | 342/124 |
| 4,566,321 A | | 1/1986 | Zacchio | |
| 4,670,754 A | * | 6/1987 | Zacchio | 342/124 |
| 5,305,237 A | * | 4/1994 | Dalrymple et al. | 342/124 |
| 5,365,178 A | * | 11/1994 | Van Der Pol | 342/124 |
| 5,507,181 A | * | 4/1996 | Fox et al. | 342/124 |
| 6,353,407 B1 | * | 3/2002 | Donnelly | 342/124 |

FOREIGN PATENT DOCUMENTS

EP    0 884 567    12/1998

* cited by examiner

*Primary Examiner*—Bernarr E. Gregory
(74) *Attorney, Agent, or Firm*—Fay Kaplun & Marcin, LLP

(57) ABSTRACT

Described is a radar filling level measuring device for non-contact measurement of a filling level of a filling matter in a vessel. A radar filling level measuring device including an electronics unit for generating transmission signals and for evaluating receiving signals reflected for a filling matter, an antenna unit connected to the electronics unit and adapted to radiate the transmission signals generated by the electronics unit in the direction of the filling matter and to receive the receiving signals reflected from the filling matter surface and to pass them on to the electronics unit, and a housing forming a cavity which is at least tight with respect to the atmosphere within the vessel and in which the electronics unit and antenna unit are acommodated. By this structure both the antenna unit and the electronics unit are protected in a technically simple and cheap way against aggressive ambient conditions and against chemical and mechanically abrasive aggression.

24 Claims, 4 Drawing Sheets

LEVEL MEASUREMENT DEVICE HAVING ELECTRONICS AND ANTENNA IN ONE HOUSING

This application claims the benefit of provisional application 60/371,990 filed Apr. 10, 2002.

BACKGROUND OF THE INVENTION

Field of the Invention

The present invention refers to a radar filling level measuring device for non-contact measurement of a filling level in a vessel or the like by means of microwaves.

Such radar filling level devices are mainly used for continuous filling level measurement as well as for limit level measurement of filling levels of any desired kind of filling matter in vessels, such as reservoirs. Filling level measuring devices of the above kind, however, might also be used for measuring the height of a liquid level of a fluid medium such as a watercourse. In that case the device should be disposed above the watercourse under a bridge or in any other way. In the present case, the term "vessel" should also embraces such environmental conditions.

The filling matter can be present either in solid or in liquid form, or may be a mixture of the two. The determination of the filling level is done using radar signals, i.e. microwave signals, in particular very short microware pulses.

In short, the present device works as follows: signals (short microwave pulses or frequency modulated microwave signals) are generated in an electronics unit and transmitted via an antenna unit in the direction of the surface of the filling matter to be measured. These signals are reflected on the filling matter surface and received by the antenna unit. The filling level can be determined using the delay of the signals.

Description of the Related Art

Usually, radar filling level measuring devices are formed to be attached in or on a vessel in such a way that the antenna itself extends through an opening in the vessel cover. The housing containing the electronics unit is arranged outside of the vessel as a matter of principle. As possibilities for attaching the radar filling level measuring devices, principally, flange and screw thread attachments are used. The flange attachment is characterized by the radar filling level measurement devices having a plate-like flange having through bores and having a connecting section extending through its central opening connecting an electronics unit of the radar filling level measuring device with the transmitting and receiving antenna. Electronics unit here refers to that portion of the filling level measuring device which generates at least the signals to be transmitted and radiated from the antenna unit in the direction of the filling matter. The attachment flange may be placed on top of a corresponding vessel flange of a vessel nozzle and screwed to it. In the screw thread attachment, the radar filling level measuring device often has a screw thread on a circumference thereof (external screw thread) which is to be screwed into a vessel opening having an internal thread.

Both types of attachment have certain common features. Both with the flange attachment and with the screw thread attachment, the electronics unit and the antenna unit are on different, opposing sides of a vessel wall. In both attachment types, the housing only serves to house the electronics unit; the separate antenna unit is always connected to this housing.

At the connecting point between the antenna unit and the housing, normally at least one connecting seam is formed having to be sealed using suitable sealing means. Since this connecting or sealing seam is situated within the vessel, it is exposed to the vessel atmosphere and must therefore be designed to be correspondingly resistant in order to ensure vessel tightness. Furthermore, with the present attachment types, all antenna units often have the problem that they tend to be soiled, the soiling being caused by the filling matter present in the vessel since they are always disposed on the inside of the vessel.

In fact, such radar filling level measuring devices have very often been used in chemically aggressive environments or in the food industry. Thus, in order to protect the antenna units from soiling and possibly against chemical or mechanically abrasive aggression, it is known in the prior art, to surround it with a solid layer of dielectric material (e.g. PP, PVDF, PTFE) or to only fill the funnel of an antenna horn element with such a material. Such radar filling level measuring devices have been manufactured and marketed for example by VEGA Grieshaber KG under the trade designation "Vegapuls 41" or "Vegapuls 43".

BRIEF SUMMARY OF THE INVENTION

According to one aspect of the present invention, an exemplary embodiment of an inventive radar filling level measurement device for non-contact measuring of a filling level of a filling matter in a vessel comprises an electronics unit and an antenna unit. The electronics unit is for generating transmitting signals and for processing and, as the case may be, for evaluating receiving signal reflected from the filling matter surface of the filling matter. The antenna unit is connected to the electronics unit and adapted to radiate the transmitting signals generated by the electronics unit and to receive the receiving signals reflected from the filling matter surface and to pass them on to the electronics unit. This exemplary embodiment of a radar filling level measuring device according to the present invention further comprises a housing completely enclosing both the electronics unit and the antenna unit. Preferably the housing consists of at least two housing portions connected to each other forming a cavity which is tight at least with respect to the atmosphere in the vessel and where the electronics unit and the antenna unit are accommodated.

In other words, the radar filling level measuring device in an exemplary embodiment of the present invention, for the first time comprises a single housing for both the electronics unit and the antenna unit. In another exemplary embodiment of the invention, a housing portion of the housing has an opening through which both the electronics unit and the antenna unit may be inserted and assembled. In operation, this opening is sealingly connected for example with a further housing portion serving as a cover, or with a further housing portion having a second opening. The tight sealing of the housing against the environing atmosphere and/or the surrounding inside of the vessel, might be ensured for example by inseparably welding or gluing the two housing portions together. By the mentioned inseparable connecting means, any further sealing elements may be mostly eliminated.

In an alternative exemplary embodiment of the present invention, the housing portions may be connected by screw-thread connections or by means of screws. By the tight connection of the individual housing portions, a single unitary housing interior is created, in which both the electronics unit and the antenna unit are mounted. Arranging both the electronics unit and the antenna unit in this single unitary interior eliminates the need for costly cable and wire passage openings between individual separate housing interior cavities. Using the radar filling level measuring device of the present invention, such structures are superfluous which in view of the sealing problems have always been a drawback in the past.

The interior of the radar filling level measuring device formed by the housing could thus completely isolated from the surrounding atmosphere. The only connection between the interior of the radar filling level measuring device and the surrounding atmosphere is by the necessarily required power lead supplying the radar filling level measuring device with energy and ensuring signal exchange. Otherwise, the interior of the radar filling level measuring device is completely isolated against the atmosphere surrounding it and, in an exemplary embodiment of the present invention, is no longer accessible. Instead of the power lead, in another exemplary embodiment of the present invention, the radar filling level measuring device may also have a socket accessible from the outside, into which the power lead may be plugged.

A radar filling level measuring device of the present invention may therefore afford the advantage that both the antenna unit and the electronics unit are arranged in the single interior space created by the housing and are sealingly surrounded by the housing, in order to protect these units against chemical and/or mechanically abrasive aggression in aggressive environmental conditions. Further, simple mounting of the compact radar filling level measuring device is ensured in any desired position of a vessel or in other measuring positions.

In an further exemplary embodiment of the present invention, the housing comprises as few individual parts as possible in order to minimize the number of seams arising at each housing portion connection.

The housing of the radar filling level measuring device itself, in another exemplary embodiment, is an integral plastics structure, which is achieved by welding or gluing together the housing portions after assembly of the electronics and antenna units. The radar filling level measuring device is for example provided with suitable attachment means on the side opposite from the radiating direction.

In another exemplary embodiment of the present invention, the radar filling level measuring device has a horn-shaped antenna. This horn-shaped antenna may either be filled or unfilled. As the filling material, for example a dielectric material, such as PP, PVDF or PTFE, may be used. The radar filling level measuring device is provided with suitable attachment means on the side opposite from the radiating direction.

According to the above-mentioned embodiment, the radar filling level measuring device is attached in its entirety at the vessel cover by means of the attachment means. To do this, an opening in the vessel cover is no longer necessary. This can be particularly advantageous in applications where such openings are undesirable or even impossible. For example in water tanks of solid reinforced concrete shells, such openings for the mounting of radar filling level measuring devices are very disadvantageous or even impossible. In such a case, the overhead mounting of such a novel radar filling level measuring device is particularly advantageous since it may very easily be attached to the inside of the vessel top by means of widely known dowels and using the above mentioned attachment means.

The present embodiment might be particularly advantageous in that each vessel of interest does not have to be specially prepared for mounting a radar filling level measuring device. Thus the vessels rather would not be provided with nozzles or screw threads as has been previously the case.

Apart from the possibility of mounting by means of dowels, the radar filling level measuring device may of course also be attached on the vessel wall using any other suitable means, such as adhesives.

According to a further exemplary embodiment of the present invention, the radar filling level measuring device may be provided with a patch antenna including the required electronics units (RF module as well as digital unit and power supply unit). The remaining structure of the radar filling level measuring device would otherwise be identical with the above mentioned embodiment. The present exemplary embodiment might be particularly advantageous in that the radar filling level measuring device can be kept very small and flat in the radiating direction by the provision of the radar filling level measuring device with a patch antenna. This might be particularly advantageous when there is very little space.

The mounting and attachment possibilities of the present embodiment may identical with those of the above explained exemplary embodiment of the present invention. Thus also the radar filling level measuring device according to this further exemplary embodiment may be doweled or glued to the inside of the vessel, or it may be attached in an already existing vessel nozzle. Moreover, the radar filling level measuring device may also be provided with a screw thread on its outer circumference so that the radar filling level measuring device may be screwed into a corresponding counter thread in a vessel.

The electronics unit generally comprises, amongst others, a transmission and a receiving unit as well as, in an exemplary embodiment of the present invention, an evaluation unit. Thus, not all units need to be arranged in the interior of the housing of the radar filling level measuring device. Of course, it is also possible, to arrange at least one of the above units on the outside and to connect it with the radar filling level measuring device using the connection cable, in order to achieve the required signal exchange and the energy supply.

For example, only the transmitting and receiving units may be accommodated in interior of the housing of the radar filling level measuring device. The evaluation unit may be remote thereof in a separate housing outside of the vessel, such as in a control room. In that case, the received echo signal, which in an exemplary mode is converted to an intermediate frequency range smaller than 1 MHz, will be transmitted via the connection cable from the receiving unit to the evaluation unit.

In a further exemplary embodiment of the present invention, a single central evaluation unit may be connected using a plurality of cables with a multitude of transmitting and receiving units, and may sequentially evaluate the receiving signals of each unit and therefore a multitude of filling levels of different vessels or vessel sections.

If the evaluation unit is accommodated in combination with the transmitting and receiving units within the housing interior of the radar filling level measuring device of the present invention, the connecting cable contains leads for energy supply of the sensor as well as for transmitting the measuring values and perhaps further information and operating parameters between the sensor and a higher level process control system.

In an other exemplary embodiment of the present invention, the connecting cable contains only two leads carrying the energy supply as well as the information exchange. Such systems have been known in such a form that the measuring value is transmitted as a value superimposed on the supply currant by the sensor (4 . . . 20 mA-two-wire sensor).

In a further variant, the information is modulated in digital form on the power supply line. Examples of such systems are Profibus-PA sensors and sensors according to the Fieldbus Foundation standard.

An advantage of the above-identified exemplary embodiments of the present invention, as has been explained, may be that for the mounting in the vessel, no "flange" or "screw thread" approach need necessarily be employed. Thanks to this novel housing, the radar filling level measuring devices may be positioned at any desired measuring positions without the need for additional auxiliary structures or extensive mounting expense. A adaptation of the radar filling level measuring device to an already present means such as a flange or a screw thread is therefore eliminated.

Alternatively to the mounting approaches already described, however, an other exemplary embodiment of the present invention may also be used for mounting it in already existing vessel nozzle openings. In that case, the radar filling level measuring device is inserted from the top into the existing vessel nozzle opening and connected to the vessel nozzle flange by means of the attachment means opposite to the radiation direction. In this exemplary embodiment suitable for mounting in existing vessel openings, it is also advantageous for the connection seam of the housing portions to be arranged outside of the vessel atmosphere. This is to achieve that the tightness of the vessel atmosphere with respect to the atmosphere surrounding the vessel is only dependent on the mounting of the radar filling level measuring device in the vessel opening, the tightness of which can usually be easily controlled. The tightness seams critical in prior approaches and responsible for vessel tightness between the antenna unit and the housing, are thus completely eliminated. Sealing of the vessel atmosphere within the radar filling level measuring device is no longer necessary, leading to a simplified construction.

The manufacture of radar filling level measuring devices of the present invention may be cheaper compared to the known more expensively structured sensor housings, since due to the simple form of the housings, the design and construction cost may be minimized.

BRIEF DESCRIPTION OF THE SEVERAL VIEWS OF THE DRAWINGS

For further explanation and to more fully understand the present invention, a number of exemplary embodiments of the present invention will be described in more detail with reference to the accompanying drawings, in which.

Like numerals have been used to designate like elements throughout in the drawings.

DETAILED DESCRIPTION OF THE INVENTION

Figure 1:
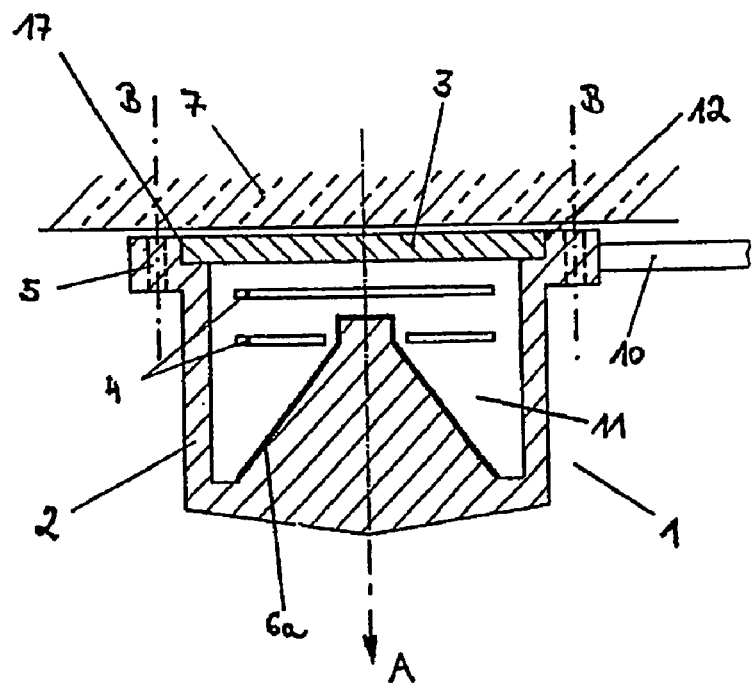
FIG. 1 is a vertical sectional view of a radar filling level measuring device according to the invention having a filled horn antenna and mounted at a vessel cover.

With reference to FIG. 1, a vertical sectional view of a radar filling level measuring device 1 attached to a vessel cover 7 is shown. The vessel cover 7 is of re-enforced concrete. The radar filling level measuring device 1, consisting of a housing pot 2 and a housing cover 3, is of plastics material, preferably PP or PTFE. The housing pot 2 is cylindrical in form and is provided with a housing flange 5 round its circumference on its side opposite from the radiating direction A and extending around its entire circumference. In the direction of the radiating direction A, the cylinder ends in a solid circular taper having a main axis coinciding with the radiating direction A. On the side opposite to the radiating direction A, the housing pot 2, on the inside of its side wall, has an annular recess 12. The circular, disk-like housing cover 3 has its diameter matched to the circular cavity formed by the recess 12.

Before the housing pot 2 is closed by the housing cover 3, the electronics unit 4 and an antenna horn 6a (only schematically shown) are mounted in the interor 11 of the radar filling level measuring device 1. A connecting cable 10 is passed through a sealed opening arranged in the housing flange 5 into the interior of the filling level measuring device 1 (not shown). As soon as these parts have been inserted and mounted, the housing pot 2 is closed by the housing cover 3. In order to seal the interior 11 of the filling level measuring device 1 against the ambient atmosphere, the seam 17 arising between the housing pot 2 and housing cover 3 will be filled with an adhesive, whereby the housing cover 3 is sealingly connected to the housing pot 2. By this tight adhesive bonding the integrity of the housing of the filling level measuring device 1 as well as the tight sealing of the housing interior 11 with respect to the ambient atmosphere surrounding the filling level measuring device 1 is ensured. Alternatively to the adhesive bonding, the housing cover 3 may also be permanently bonded the housing pot 2 by welding.

Instead of the permanent bonding, it is also possible to screw the cover 3 by means of a screw thread or to connect the cover 3 on the housing pot 2 by means of screws. For the latter approach, the use of an additional gasket is necessary.

The filling level measuring device 1 is finally attached to the re-enforced concrete vessel top wall 7. To do this, a multitude of suitable attachment means may be used. Dowels, arranged in the axes B, are particularly suitable for this. A different, very advantageous and easily manageable attachment approach of the filling level measuring device 1 to the vessel top wall 7, consists in gluing the housing cover 3 to the vessel top wall 7. Suitable adhesives are in particular high-performance adhesives, such as epoxy resins. A third approach for the attachment consists in the use of a jointing flange which is slipped over the housing as a separate annular part and is attached to the vessel top wall.

Figure 2:
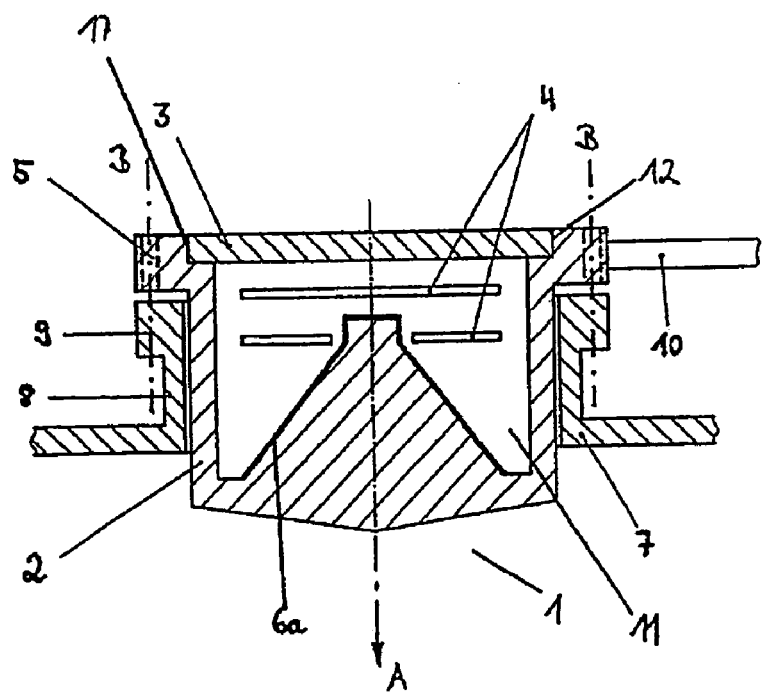
FIG. 2 is a vertical sectional view of a radar filling level measuring device according to the invention having a filled horn antenna and attached in a vessel nozzle.

FIG. 2 shows a sectional view of a filling level measuring device 1 attached in a vessel nozzle 8 having a flange 9. The filling level measuring device 1 is no different from the one in FIG. 1. The filling level measuring device 1 is attached in the vessel nozzle 8 via the annular vessel flange 9 on the housing flange 5, wherein the flange 5 of the filling level measuring device 1 is adjacent to the flange 9 of the vessel. Suitably screws in the axes B are used here as an attachment means. Also conceivable, of course, would be, analogous to the attachment type used in FIG. 1, to glue together the flanges 5 and 9 at their common seam, or alternatively, the use of a jointing flange.

Figure 3:
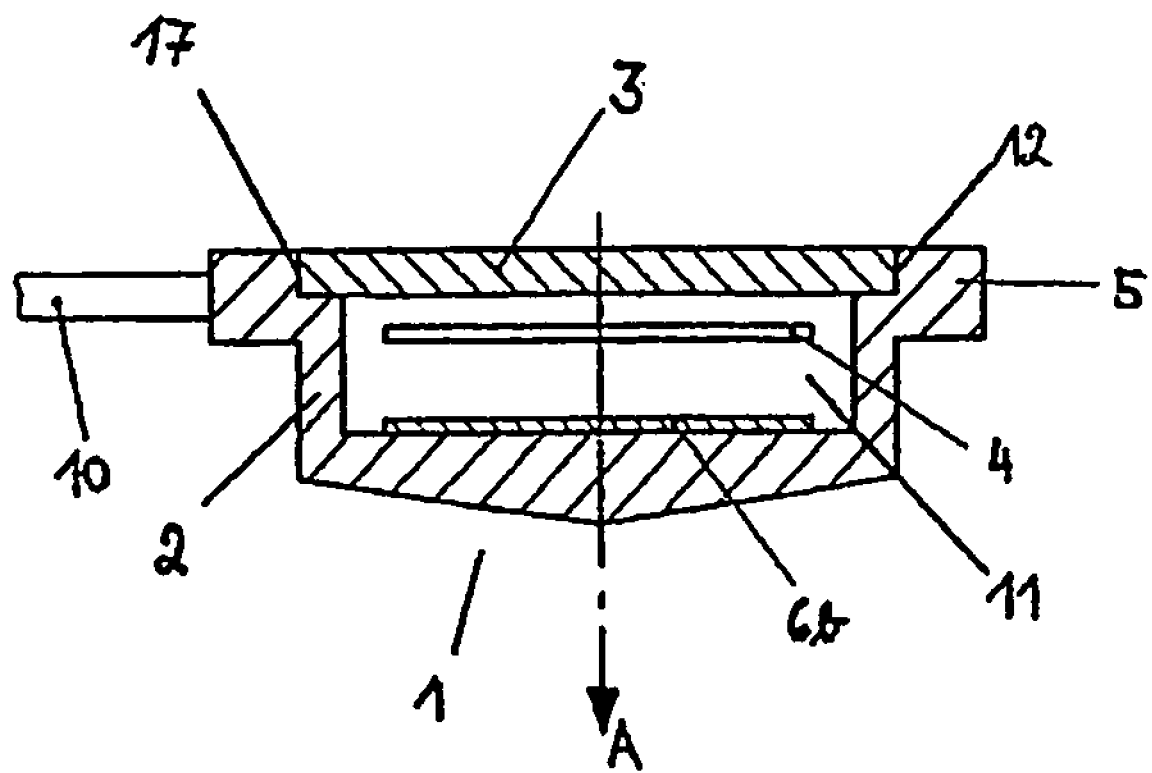
FIG. 3 is a vertical sectional view of a radar filling level measuring device of the present invention having a patch antenna.

In FIG. 3, a vertical sectional view of a filling level measuring device 1 having a patch antenna is shown. The filling level measuring device 1, consisting of a housing pot 2 and the housing cover 3, is made of plastics material. The housing pot 2 has a flat cylindrical form and is provided with a housing flange extending around its periphery and extending round the entire circumference of the housing pot 2. In the direction of radiating direction A, the cylinder ends in a solid circular taper, whose main axis coincides with the radiating direction A. On its side opposite the radiating direction A, the housing pot 2 has an annular recess 12 on the inside of its side wall. The circular, disk-like housing cover 3 has its diameter matched to the circular cavity formed by the recess 12.

Before the housing pot 2 is closed by the housing cover 3, the electronics unit 4 (only schematically shown) and a patch antenna 6b are mounted in the interor 11 of the radar filling level measuring device 1. The connecting cable 10 is passed through a sealed opening arranged in the housing flange 5 into the interior of the radar filling level measuring device 1 (not shown). As soon as these parts have been inserted and mounted, the housing pot 2 is closed by the housing cover 3. In order to seal the interior 11 of the filling level measuring device 1 against the ambient atmosphere, the seam 17 arising between the housing pot 2 and housing cover 3 will be filled with an adhesive, whereby the housing cover 3 is sealingly connected to the housing pot 2. By this tight adhesive bonding the integrity of the housing of the filling level measuring device 1 as well as the tight sealing of the housing interior 11 with respect to the ambient atmosphere surrounding the filling level measuring device is ensured. Alternatively to the adhesive bonding, the housing cover 3 may also be permanently bonded the housing pot 2 by welding.

Instead of the permanent bonding, it is also possible to screw the cover 3 by means of a screw thread or to connect the cover 3 on the housing pot 2 by means of screws. For the latter approach, the use of an additional gasket is necessary.

Figure 4:
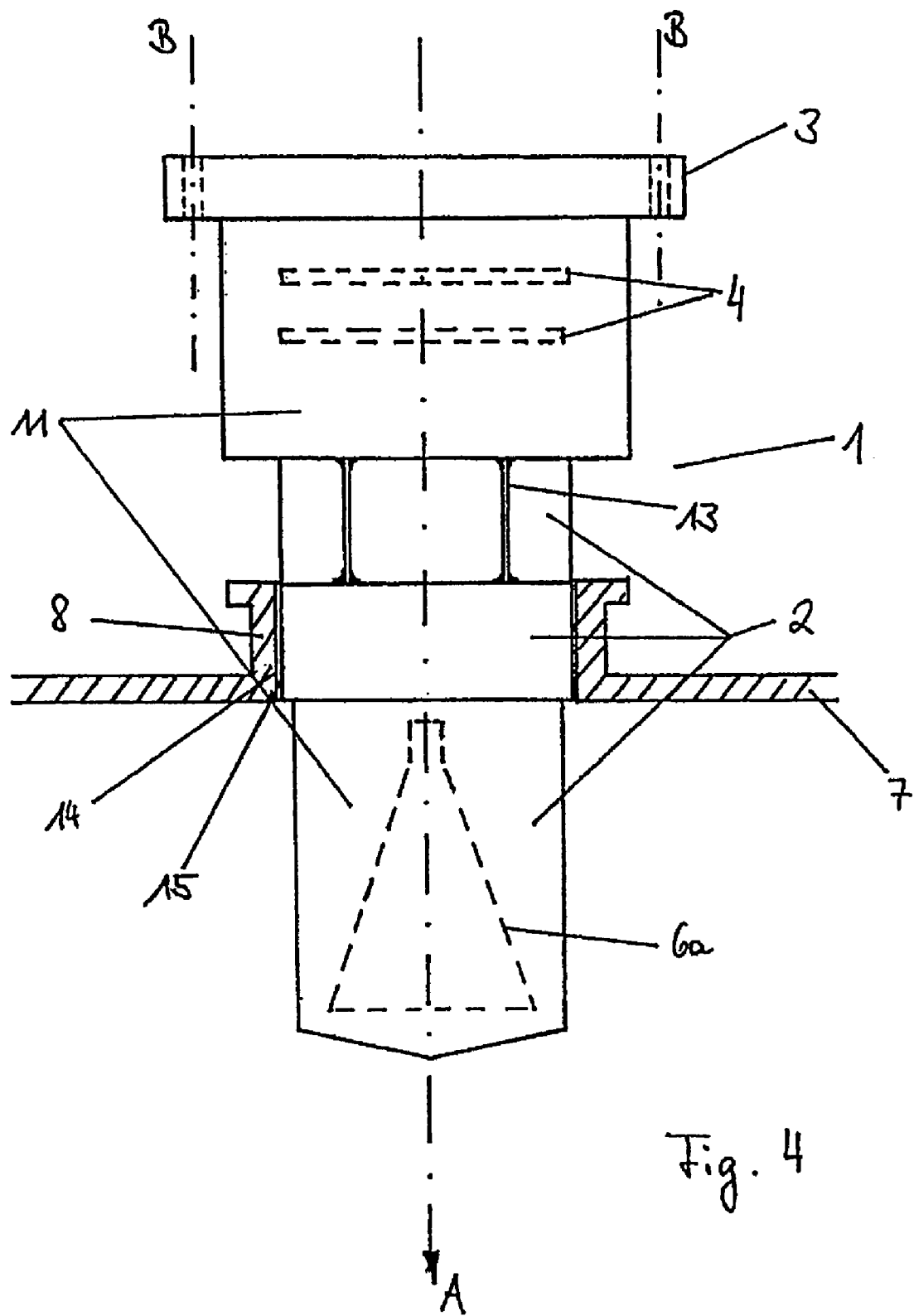
FIG. 4 shows a screw-type radar filling level measuring device of the present invention having an outer contour.

FIG. 4 shows a further exemplary embodiment of a radar filling level measuring device of the present invention screwed into a vessel nozzle 8 having an internal thread 15. The housing pot 2 is provided with an angular outside contour 13 and an external thread 14. The radar filling level measuring device 1 can be screwed using a tool using said outside contour 13, preferably in the form of a hexagon, into the internal thread 15 of the vessel nozzle 8. The housing portions 2 and 3 of the radar filling level measuring device 1 in this embodiment, as against previous embodiments, have a different form which, however, does not have any effect on the principal structure of the radar filling level measuring device 1, therefore not deviating from the previous embodiments. Thus the radar filling level measuring device 1 of the present embodiment, in its single interior 11 also has a horn antenna 6a and an electronics unit 4. Instead of the horn antenna 6a, in this embodiment, one or more patches can of course also be used as the antenna unit.

Of particular advantage in the embodiment shown in FIG. 4 is the avoidance of a connection or sealing seam of the housing within the vessel. The connection between the housing pot 2 and the housing cover 3 lies outside of the vessel atmosphere and may be achieved in the same way as shown in FIG. 1, 2 or 3. The tightness of the vessel with respect to the ambience, however, is not affected by a connection seam of two structural parts of the radar filling level measuring device.

Unlike the view shown in FIG. 4, the present embodiment may also be attached on a vessel flange according to the previous embodiments using screws arranged in the axes B. The present embodiment is also suited for the previously described mounting on the top wall, wherein the radar filling level measuring device 1 is either glued or screwed to the cover 3.

Figure 5:
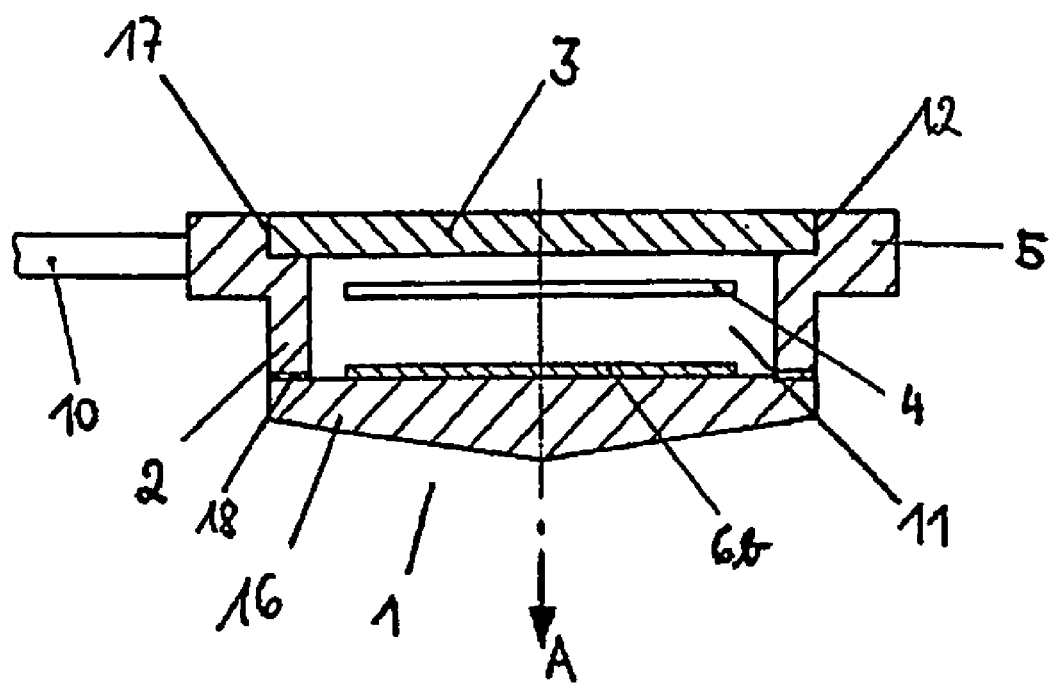
FIG. 5 is a vertical sectional view of a radar filling level measuring device of the present invention having three housing portions.

FIG. 5 shows a sectional view of the principal structure of a housing of a further exemplary embodiment of a radar filling level measuring device of the present invention, consisting of three housing parts 2, 3 and 16 bonded at the associated seams 17 or 18 using suitable means. The remaining structure of the embodiment shown in FIG. 5 is identical to the structure of the embodiment shown in FIG. 3. The difference of the embodiment shown in FIG. 5 as against the embodiment according to FIG. 3 is only that the housing of the radar filling level measuring device is assembled from three individual housing parts 2, 3 and 16. Of course, the housing can also be assembled from any number of housing parts. This can be particularly advantageous when for example the housing capacity has to be enlarged.

Changes can of course be made on the embodiments of the present invention without departing from the scope of the invention. The embodiments mentioned only serve to more fully explain the invention and may in no way be construed as restricting the scope of protection of the present invention.

The invention claimed is:

1. A radar filling level measuring device for non-contact measurement of a filling level of a filling matter in a vessel, comprising:
    an electronics unit generating transmitting signals and processing receiving signals reflected from a filling matter surface of the filling matter;
    an antenna unit connected to the electronics unit and adapted to radiate the transmission signals generated by the electronics unit in a direction of the fllling matter and to receive the receiving signals reflected from the filling matter surface and to pass them on to the electronics unit; and
    a housing having a cavity, the cavity being at least tight with respect to an atmosphere in the vessel, the electronics unit and the antenna unit being situated in the cavity.

2. The radar filling level measuring device according to claim 1, wherein the housing consists of at least two housing portions connected to each other.

3. The radar filling level measuring device according to claim 2, wherein an area in which the at least two housing portions are connected to each other is adapted to be outside of the vessel when the radar filling level measuring device is mounted at the vessel.

4. The radar filling level measuring device according to claim 2, wherein at least one of the at least two housing portions has at least one insertion opening formed so that at least one unit of a group of units is insertable and the other of the at least two housing portions is adapted for closing the at least one insertion opening, the group of units consisting of the electronics unit and the antenna unit.

5. The radar filling level measuring device according to claim 2, wherein each of the at least two housing portions encloses a cavity which is open at least to one side, the at least two housing portions being joined to each other at their open sides.

6. The radar filling level measuring device according to claim 5, wherein between the at least two housing portions, each enclosing a unilaterally open cavity, at least one further housing portion is inserted to enlarge the cavity formed by the at least two housing portions together.

7. The radar filling level measuring device according to claim 2, wherein the at least two housing portions are joined using at least one screw connection.

8. The radar filling level measuring device according to claim 2, wherein the at least two housing is formed having an attachment arrangement for mounting the radar filling level measuring device.

9. The radar filling level measuring device according to claim 8, wherein each of the at least two housings has through-openings for attachment screws of the attachment arrangement.

10. The radar filling level measuring device according to claim 8, wherein each of the at least two housings has at least one attachment surface for positioning the radar filling level measuring device adjacent to one of a top wall and a side wall of the vessel as the attachment arrangement.

11. The radar filling level measuring device according to claim 8, wherein each of the at least two housings has a flange on the outside serving as the attachment arrangement.

12. The radar filling level measuring device according to one of claim 2, wherein each of the at least two housings has at least one attachment surface for positioning the radar filling level measuring device adjacent to one of a top wall and a side wall of the vessel and through-openings for attachment screws as an attachment arrangement for mounting the radar filling level measuring device.

13. The radar filling level measuring device according to claim 2, wherein each of the at least two housings has a screw thread on an outside that may be screwed into a vessel opening having an internal thread as an attachment arrangement for mounting the radar filling level measuring device.

14. The radar filling level measuring device according to claim 13, wherein the at least two housings has an outside contour serving to provide engagement using a tool in addition to the outside screw thread.

15. The radar filling level measuring device according to claim 14, wherein the outside contour has a hexagonal shape to be engaged by a spanner.

16. The radar filling level measuring device according to claim 2, wherein at least one of the at least two housing portions consists of a plastics material.

17. The radar filling level measuring device according to claim 16, wherein the plastics material is one of PP and PTFE.

18. The radar filling level measuring device according to claim 1, wherein the at least two housing portions are welded together.

19. The radar filling level measuring device according to one of claim 1, wherein the at least two housing portions are glued together.

20. The radar filling level measuring device according to claim 1, wherein the housing has a connection by which the electronics unit is supplied with energy and through which a communication is achievable with the radar filling level measuring device.

21. The radar filling level measuring device according to claim 1, wherein the antenna unit includes one of a horn antenna and a patch antenna.

22. A radar filling level measuring device for non-contact measurement of a filling level of a filling matter in a vessel, comprising:
   a circuit generating transmitting signals and processing receiving signals reflected from a filling matter surface of the filling matter;
   an antenna assembly connected to the circuit and adapted to radiate the transmission signals generated by the circuit in a direction of the filling matter and to receive the receiving signals reflected from the filling matter surface and to pass them on to the circuit; and
   a housing consisting of at least two housing portions tightly connected to each other at a plurality of connection areas and forming a cavity which is tight with respect to the atmosphere in the vessel;
   an attachment arrangement attaching the radar filling level measuring device at the vessel,
   wherein the attachment arrangement is arranged in the housing so that, viewed in the direction of radiation of the transmission signals, a first portion of the housing is in front of the attachment arrangement and a second portion of the housing is behind the attachment arrangement,
   wherein the circuit and the antenna assembly are accommodated in the cavity, and
   wherein the connection areas are in the first portion of the housing.

23. The radar filling level measuring device according to claim 22, wherein the attachment arrangement includes an attachment flange.

24. The radar filling level measuring device according to claim 22, wherein the attachment arrangement includes a screw thread formed as an external thread on the housing and which may be screwed into a screw thread in a vessel opening.

* * * * *